United States Patent Office 3,514,683
Patented May 26, 1970

---

3,514,683
STARTING APPARATUS FOR SINGLE-PHASE MOTORS
Holger V. Vind, Nordborg, Denmark, assignor to Danfoss A/S, Nordborg, Denmark, a company of Denmark
Filed Oct. 26, 1966, Ser. No. 589,556
Claims priority, application Germany, Oct. 26, 1965, D 48,506
Int. Cl. H02p 1/44
U.S. Cl. 318—221   10 Claims

ABSTRACT OF THE DISCLOSURE

Motor starting apparatus for single-phase asynchronous induction motors comprising a switch having a movable contact operable to a position disconnecting the motor starting winding. The apparatus has an electromagnetic device having a holding coil shunting the switch contact in series with the motor starting winding holding the contact opening the starting winding circuit. The holding coil has a voltage applied consisting of a combination of the line voltage and the voltage induced in the auxiliary winding by the rotating magnetic field sufficient to hold the movable contact in its open position.

---

This invention relates generally to single-phase, asynchronous, induction motors having a main winding and an auxiliary or starting winding in a split-phase configuration and more particularly to a starting apparatus for such a motor.

Starting devices or apparatus making use of a thermal-responsive starting arrangement for single-phase asynchronous motors are known. One type is disclosed in my copending application Ser. No. 562,168, filed July 1, 1966. The starting device disclosed in the copending application relates to a bimetal switch which is heated by current flow therethrough since it is connected in series with the auxiliary or starting winding of the motor. The switch is influenced by an auxiliary heating device which keeps it open and which is energized by a voltage corresponding to the vector voltage difference between the voltage of the main winding and that of the starting winding. By relying on the vector difference a control quantity is obtained which is largely constant substantially throughout all operational conditions, i.e. from zero starting speed to nominal rated speed of the motor or from low voltage to excess voltage conditions. For example, with a radio of 1:8.5 for the extreme values of the current energizing the main winding the resulting ratio for the vector voltage difference is only 1:1.6.

It is a principal object of the present invention to provide a new and improved starting apparatus for single-phase, split-phase induction motors.

Another object of the present invention is to provide a new and improved starting apparatus or arrangement for induction motors in which a vector voltage difference between the voltage across the main winding and the voltage across the auxiliary winding energizes an electrically controllable holding device which is effective to control a starting switch, controlling the starting winding, in a selected operative position which is an "open" operative position.

A feature of the starting device in accordance with the invention is that a constant value of an available control quantity is applied to a bimetallic starting switch, which connects and disconnects the starting winding, and a holding device in the apparatus for maintaining the starting switch in a desired operative condition.

The starting device or apparatus in accordance with the invention may be constructed in different ways, for example, a movable, bimetallic switch contact or element is energized by current therein and heated by the current to an operative "open" position and the switch contact is constructed so that it may be attracted and held in an "open" condition by an electromagnetic holding device. The switch disconnects the starting winding when operating conditions have been reached by the induction motor.

A particularly compact apparatus may be constructed in accordance with the invention by the provision of an electromagnetic holding element for the bimetallic element and if the holding device is constructed as a coil electromagnetically encircling two bimetallic elements or paired bimetallic elements defining a switch disconnecting the starting winding of the motor.

An embodiment of the apparatus provides for gravity biasing of the switch to an open position while another embodiment has the switch controlling the starting winding of the motor biased to a closed condition by an electromagnet while an auxiliary winding thereof will hold the starting switch open. Provision is also made for damping the electromagnet in one embodiment.

Still another feature of the present invention is the provision of a starting switch actuated by means of operating coil of an armature of an electromagnet of a holding device energized by current flow through the main winding. The armature is electromagnetically biased in a direction opposite to the closing direction of the switch and a holding device in the apparatus comprises an auxiliary winding of the electromagnet. When the switch opens only a little the attractive force of the holding coil will operate immediately and insure a positive opening moment. During the closing movement of the switch element full contact pressure is operative only when the contacts touch. The effect of the positive movement and pressure is to eliminate chatter.

Other features and advantages of the starting apparatus in accordance with the present invention will be better understood as described in the following specification and appended claims, in conjunction with the following drawings in which:

Figure 1:
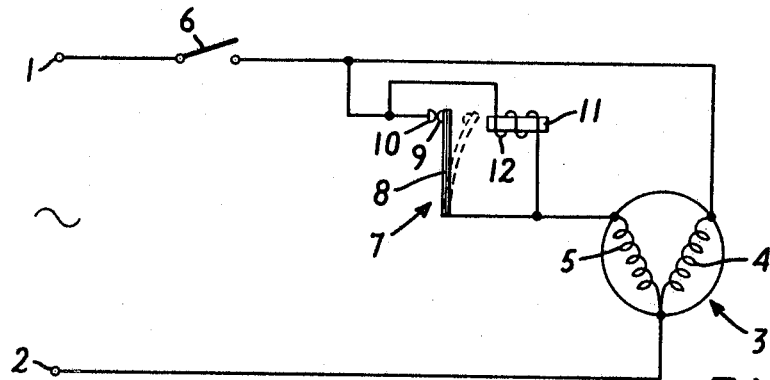
FIG. 1 is a schematic circuit of a split-phase induction motor provided with a starting apparatus in accordance with the invention.

As can be seen in FIG. 1 an alternating current source, not shown, is connectable through terminals 1, 2 to a single phase induction motor 3 having a split-phase and constituting an asynchronous single-phase induction motor. The induction motor is provided with a main winding 4 and an auxiliary or starting winding 5 in the usual split-phase configuration. An operating or main switch 6 is provided for connecting the motor 3 to the power source, not shown. When the switch 6 is closed a voltage is applied across the main winding 4 and through a starting apparatus or arrangement 7 across the starting winding 5.

The starting apparatus or arrangement 7 comprises a movable bimetallic switch contact element 8 having a movable contact 9 cooperative with a fixed contact 10 for opening and closing the circuit to the starting winding 5. The switch 8, 9, 10 is shunted by an electromagnet 11 having an operating coil or winding 12. When the motor starts it accelerates and starting current passing through the bimetallic starting switch element 8 heats it so it bends, after the desired delay, to the position illustrated in broken lines opening the switch. With the switch in an open condition the starting winding is taken out of series circuit with the switch and the starting current is interrupted. The operating coil or winding 12 is then energized with a voltage corresponding to the vector difference between the voltage across the main winding 4 and a voltage across the starting winding 5. The bimetallic element 8 is constructed so that when the electromagnet 11 is energized it will be attracted and held in an "open" or attracted position so that the electromagnet 11 constitutes a holding device holding the switch in an "open" condition.

It should be noted that the voltage energizing the electromagnet 11 becomes fully effective when the switch element 8 is "opened" and is not affected by the opening of the bimetallic switch element or contact 8 because the potential difference between the voltages across the main and starting winding remains practically constant during the entire operation of the motor.

In the embodiment illustrated in FIG. 1 the laminated bimetallic element 8 preferably has a bimetal element facing the electromagnet 11 which is ferromagnetic i.e. consists of iron, for example. Those skilled in the art will recognize that the bimetallic strips may be non-magnetic and a piece of magnetizable or magnetic material may be attached to the strips in order to render the element 8 cooperative with the electromagnet in the manner heretofore described for attraction and holding thereof.

Figure 2:
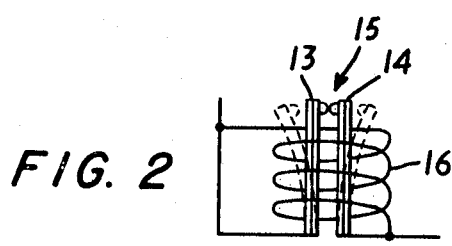
FIG. 2 is a fragmentary schematic circuit of the type illustrated in FIG. 1 and is illustrative of another embodiment of a starting arrangement in accordance with the present invention.

A second embodiment of a starting arrangement consisting of a switch and holding device in accordance with the invention is illustrated in FIG. 2. In this figure the switch and holding device are illustrated without connections to an induction motor and power source, However, it will be understood that the connections are the same as those in FIG. 1. In the instant case two bimetallic elements 13, 14 form the switch 15 and have contacts therein normally closed so that when the main operating switch, not shown, is closed the bimetallic strips will be heated and bend away from each other assuming positions illustrated by broken lines so that the starting apparatus switch 15 is "opened." In this second embodiment a coil 16 shunts the switch and electromagnetically maintains the bimetallic strips 13, 14 open during operation and therefore interrupting the starting current to the winding 5 after the motor is up to the desired or rated speed. It is, of course, understood that the bimetallic strips 13, 14 are suitably constructed to be so "held."

Figure 3:
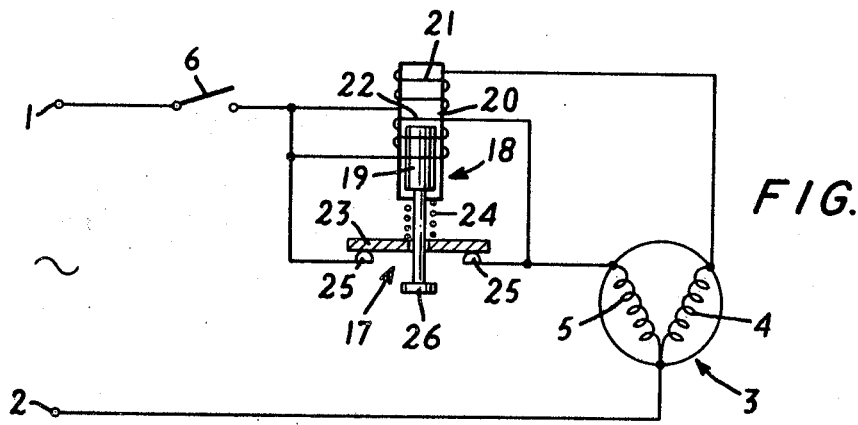
FIG. 3 is a schematic diagram of an induction motor provided with a third embodiment of a starting arrangement in accordance with the invention and is illustrative of a damped apparatus or device used in the starting arrangement of the invention.

In the embodiment of the invention illustrated in FIG. 3 the parts corresponding to similar parts in FIG. 1 have reference numerals corresponding to the parts in FIG. 1. An induction motor 3 is shown connectable to a power source through power input terminals 1, 2 and a main switch 6. The motor has a main winding 4 and a starting winding 5 arranged in a split-phase configuration in the manner of the motors heretofore described. The motor is provided with a starting apparatus 17 having an electromagnet 18 comprising an armature 19 encased in a casing 20. The armature is damped, for example, by the provision of a liquid in the casing 20 which due to the limited clearance between the armature and the casing carries out a throttling effect. The armature is actuated by a coil 21, in series with the main winding, energized by current passing through the main winding and by an auxiliary coil 22 in series with the starting winding. The auxiliary winding 22 is energized by a voltage corresponding to the vector difference between the voltage across the main winding and the voltage across the starting winding.

In the instant case the starting switch comprises a movable contact 23 biased by a spring 24 to a position bridging fixed contacts 25 in series with the starting winding 5. The armature 19 has an axial extension of reduced diameter extending outwardly of the casing 20 through the movable contact and on an operative or free end thereof provided with a switch-actuating tip or operator 26.

When the main switch 6 is closed current applied to the main winding energizes the coil 21 in series therewith whereby the armature 19 is attracted and moves upwardly within the casing 20 in a delayed manner due to the throttling action of the liquid in the casing. When the armature has moved sufficiently upwardly it causes the operator 26 to move the movable contact 23 away from the fixed contacts. With the switch 23, 25 open the auxiliary coil 22 becomes fully effective and the starting switch is held open even if the current of the main winding has fallen to a low operational value.

Figure 4:
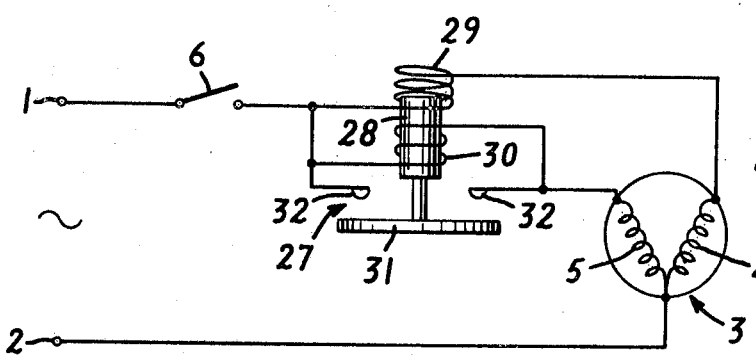
FIG. 4 is a schematic of an induction motor provided with a fourth embodiment of a starting arrangement in accordance with the invention.

A fourth embodiment of the starting apparatus in accordance with the invention is illustrated in FIG. 4. As illustrated in the drawing, in which the reference numerals corresponding to similar parts of FIGS. 1 and 3 are used, a split-phase motor 3 is energized from a power source, not shown, connected thereto by power input terminals 1, 2 and is provided with a main winding 4 and a starting winding 5 energized when a main switch 6 is closed. The motor is provided with a starting apparatus 27 in which a holding device comprising an armature 28 actuated by a first coil 29, in series with the main winding 4, and a secondary or auxiliary coil 30, wound in an opposite direction and in series with the starting winding 5. The secondary or coil 30 is energized by a vector potential difference as heretofore described. The switch according to the invention comprises a movable contact 31, fixed to and operated by the armature 28, which bridges fixed contacts 32 for closing a circuit to the starting winding 5. The auxiliary coil 30 shunts the switch. The weight of the moving parts 28, 31 of the apparatus gravity bias the switch to a normally open position. The coil 30 when energized develops an opening moment while the coil 29 actuates the armature in a closing direction so that the coil 30 may be considered as opposing the coil 29.

In order to understand the operation of the apparatus let it be assumed that the coil 29 at the moment of starting operates with 500 ampere turns and after the motor has accelerated to its rated or operating speed it operates with 200 ampere turns. The coil 30 is assumed to operate with a constant operating condition, for example 100 ampere turns. The weight of the moving parts is the equivalent to an effect corresponding to 300 ampere turns. Thus, when the switch 6 is closed 100 ampere turns are effective in a closed direction. After the contact 31 bridges the stationary contacts 32 the auixiliary coil 30 becomes ineffective and the contact pressure increases to about 200 ampere turns. When the current of the main winding decreases due to the motor having reached its operating speed a condition obtains whereby the weight of the moving elements heretofore described overcomes the effect of the coil 29 and the switch opens. As soon as the switch has opened the holding coil 30 is fully effective again so that the opening movement proceeds quickly and safely. The switch, therefore, remains in an open condition even if the current of the main winding should fluctuate or vary. This configuration provides positive movement and overcomes a possibility of chatter during operation.

Those skills in the art will recognize that the above described embodiments may be notified in many ways without departing from the basic scope of the invention. For example, the operating coil 21 may be connected in series with the starting switch 23, 25. Furthermore, the bimetal switch element 8 may be heated by an additional or auxiliary heating device through which current from the main winding flows and heats it. The starting switch in the invention may be actuated by means of a relay having in the control circuit thereof the above described operations taking place. A further modification may be made by use of a photoelectric switching arrangement in which the vector potential difference may, for example, supply a light source and thus generate a steady continuous exposure. Furthermore, a cathode ray beam may be used to effect control and a vector voltage difference may be applied across the deflecting plates or electrodes of the cathode ray tube to deflect the beam and cause a constant deflection of the beam.

While preferred embodiments of the invention have been shown and described it will be understood that many modifications and changes can be made within the true spirit and scope of the invention.

What I claim and desire to secure by Letters Patent is:

1. A motor starting apparatus for use with a single-phase, split-phase asynchronous induction motor having a main winding and a starting winding in a split-phase configuration and having connections for application of a voltage to said main winding and to said starting winding with a vector voltage difference between the windings, said apparatus comprising, a switch connected to said first-mentioned connections in series with said starting winding, said switch having at least one movable contact operable to a first operative position connecting said starting winding in series therewith a second open operative position disconnecting said starting winding from said switch, an electromagnetic holding device connected to said windings and having means including a holding coil shunting said switch contact in series with said starting winding energized by a vector voltage difference between a voltage applied to said main winding and a voltage applied to said starting winding effective electromagnetically to cause said contact to be maintained in said second position when said contact is in said second position and said motor is in operation, and said switch comprising means effectively causing said contact to operate to said first operative position so that said switch is closed when said motor is initially energized, and said apparatus comprising means cooperative with said contact effective to operate said contact to said second position and disconnect said starting winding after said motor has reached a given operative condition.

2. A motor starting apparatus according to claim 1, in which said means effective to cause said contact to be maintained in said second position comprises an electromagnet.

3. A motor starting apparatus according to claim 2, in which said contact comprises a bimetallic contact having thereon said means effectively causing said contact to operate to said first operative position, and said holding coil.

4. A motor starting apparatus according to claim 3, including a second bimetallic contact cooperative with the first contact and means effectively causing said second bimetallic contact operable to said first and second operative positions, and said coil effective to maintain both contacts in said second operative position.

5. A motor starting apparatus according to claim 1, in which said holding device means comprises an electromagnet having an armature connected to said contact for operating said contact to said second position, and means damping movement of said armature.

6. A motor starting apparatus according to claim 1, in which said holding device comprises an electromagnet having a movable armature operating said contact to said second operative position.

7. A motor starting apparatus according to claim 6, in which said electromagnet armature is gravity biased in a direction toward operating said contact to said second operative position, said electromagnet armature comprises means operably connecting it to said contact for actuating it to said first and second operative positions.

8. A motor starting apparatus according to claim 7, in which said means shunting said switch contact comprises a secondary coil on said electromagnet effective in operation to develop a moment on said armature in a direction for moving said contact to said second operative position.

9. A motor starting apparatus according to claim 6, in which said armature comprises means operably connecting said armature to said contact for actuating said contact to said operative position, and means biasing said armature in a direction operating said contact to said first operative position.

10. A motor starting apparatus for use with a single-phase, split-phase, asynchronous induction motor having a main winding and a starting winding in a split-phase configuration and having connections for application of input voltage to said main winding and to said starting winding with a vector voltage difference between the windings, said apparatus comprising a starting switch connected in operation in series with said starting winding, disconnecting said starting winding when the motor reaches a given operating condition after starting thereof, and a holding device comprising electromagnetic means including an operating coil energized by said vector voltage difference holding said starting switch in an opened condition during operation of said motor once said given operating condition obtains.

References Cited

UNITED STATES PATENTS 2,175,032   10/1939   Schaefer _____ 318—221

ORIS L. RADER, Primary Examiner

G. RUBINSON, Assistant Examiner